United States Patent

[11] 3,598,478

| [72] | Inventor | Malcolm G. Townsley |
| | | Park Ridge, Ill. |
| [21] | Appl. No. | 778,965 |
| [22] | Filed | Nov. 26, 1968 |
| [45] | Patented | Aug. 10, 1971 |
| [73] | Assignee | The Plastic Contact Lens Company |
| | | Chicago, Ill. |

[54] APPARATUS FOR DETERMINING CORNEA CONTOUR
8 Claims, 15 Drawing Figs.

[52] U.S. Cl. ........................ 351/6, 351/7, 351/13, 351/16
[51] Int. Cl. ........................ A61b 3/14, A61b 3/10
[50] Field of Search .................. 351/1, 6, 7, 16, 13, 38, 39, 40; 350/187

[56] References Cited
UNITED STATES PATENTS

| 1,006,825 | 10/1911 | Buckhop | 351/6 X |
| 1,721,208 | 7/1929 | Currier et al. | 351/7 X |
| 2,940,357 | 6/1960 | Oswold | 351/38 |
| 3,141,396 | 7/1964 | Kimball et al. | 351/7 X |
| 3,248,162 | 4/1966 | Knoll | 351/6 |
| 3,403,957 | 10/1968 | Wilkinson | 351/38 |
| 3,463,579 | 8/1969 | Papritz | 351/38 |
| 3,351,411 | 11/1967 | Chapman | 350/187 |

FOREIGN PATENTS

| 11,409 | 5/1905 | Great Britain | 351/6 |
| 137,766 | 0/1961 | U.S.S.R. | 351/13 |

Primary Examiner—David Schonberg
Assistant Examiner—Paul A. Sacher
Attorney—McDougall, Hersh, Scott & Ladd ABSTRACT: An apparatus for determining the contour of the human cornea comprising a substantially opaque target having a plurality of light-transmitting gaps through which light beams can be projected onto the eye of a patient. The pattern of light beams reflected in the eye can then be photographed with the particular configuration providing a basis for determining mathematically the contour of the eye. The target structure comprises a pair of hollow plastic shells provided with an opaque coating. The coating is removed in selected areas to provide the light-transmitting gaps. The shells are mounted at one end of an adjustable housing, and a camera and through-the-lens focusing means are located at the opposite end of the housing. The adjusting means comprise double joint ball and socket means which permit the operator to make finite adjustments for accurate alignment while viewing the eye.

INVENTOR
Malcolm G. Townsley
by McDougall, Hersh, Scott and Ladd
Att'ys

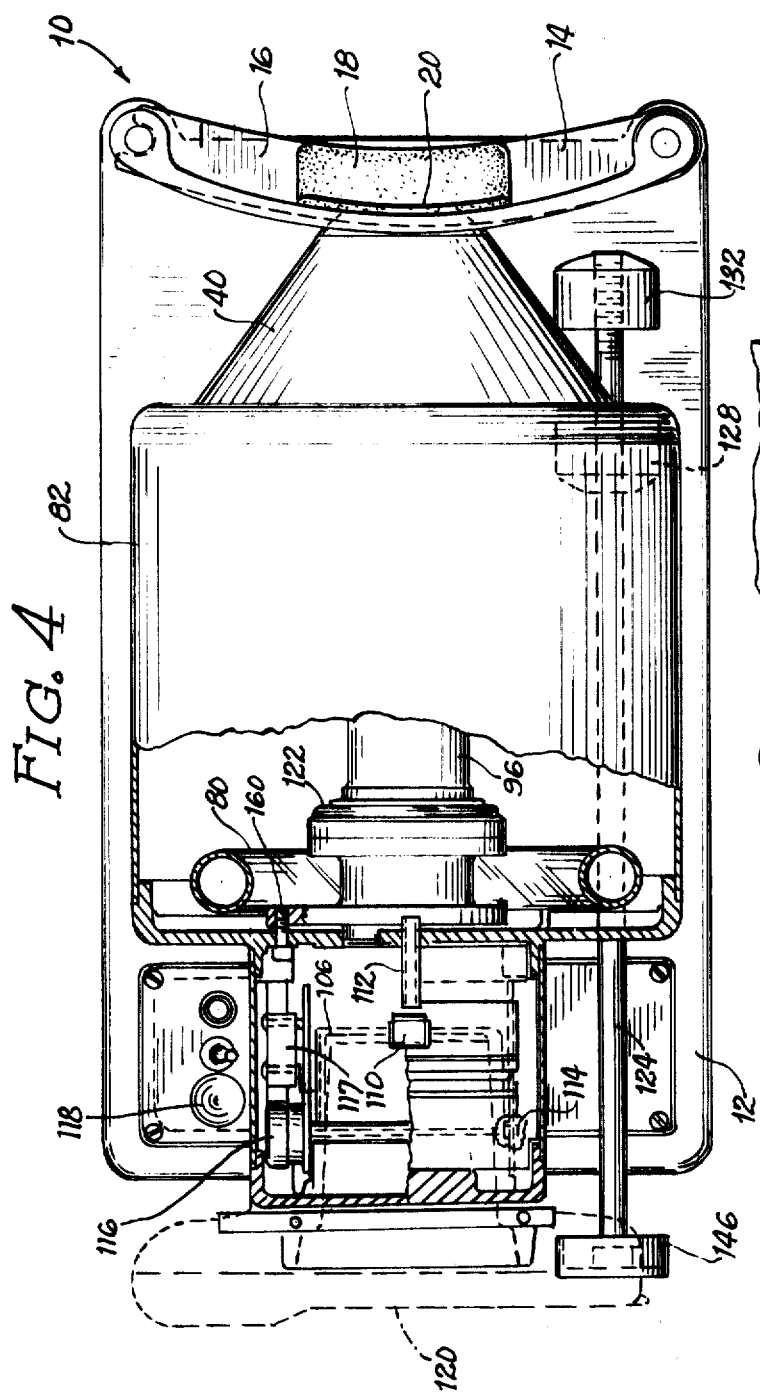
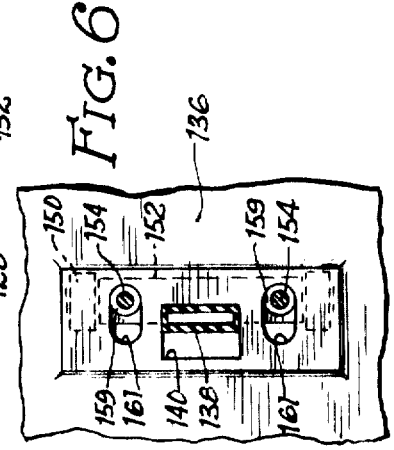
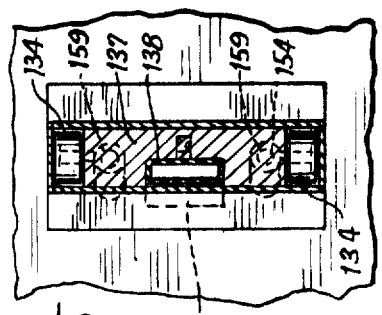

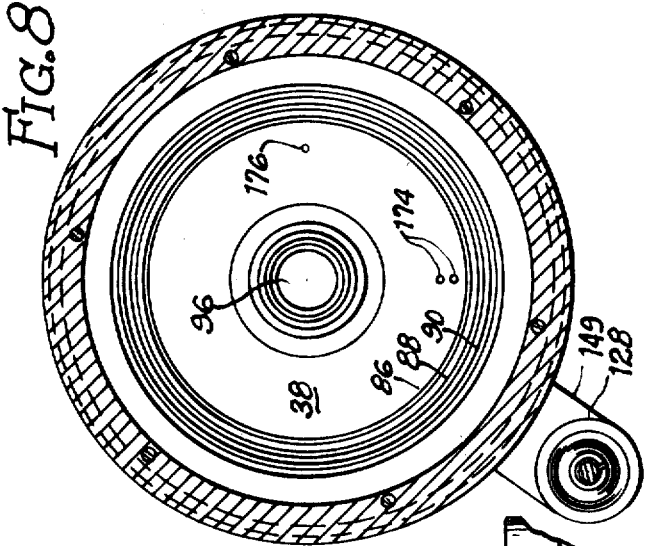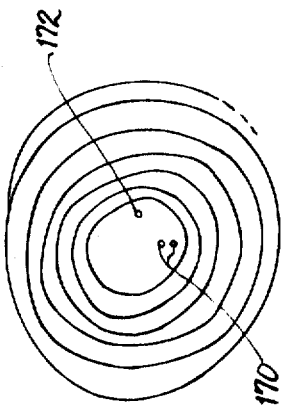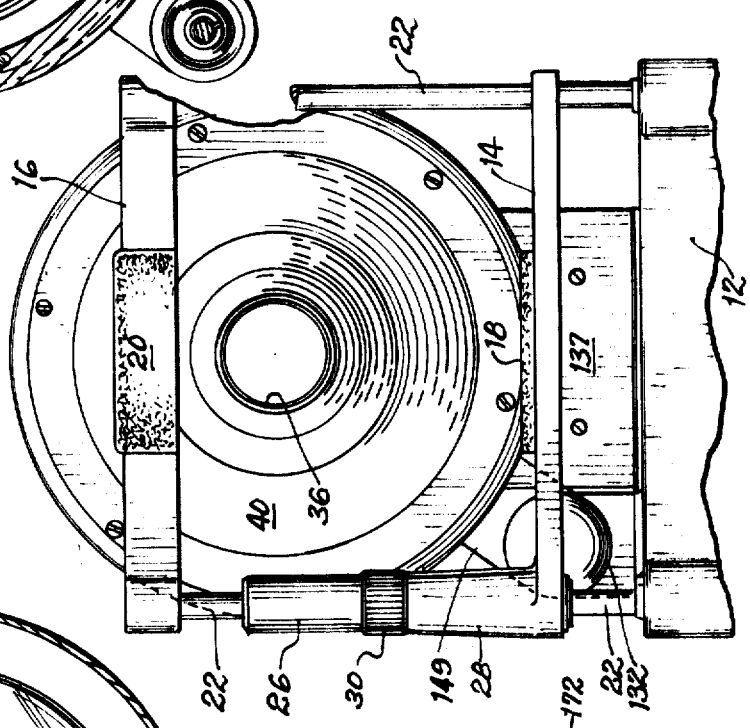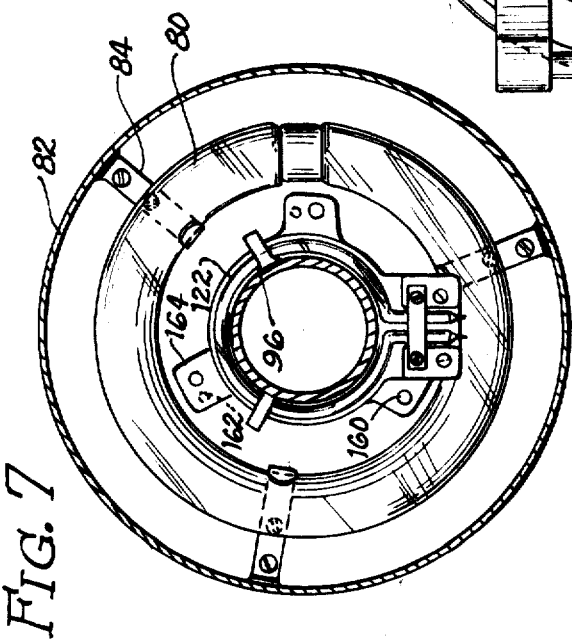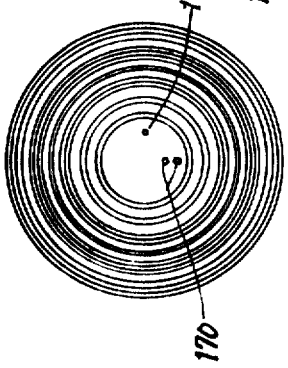

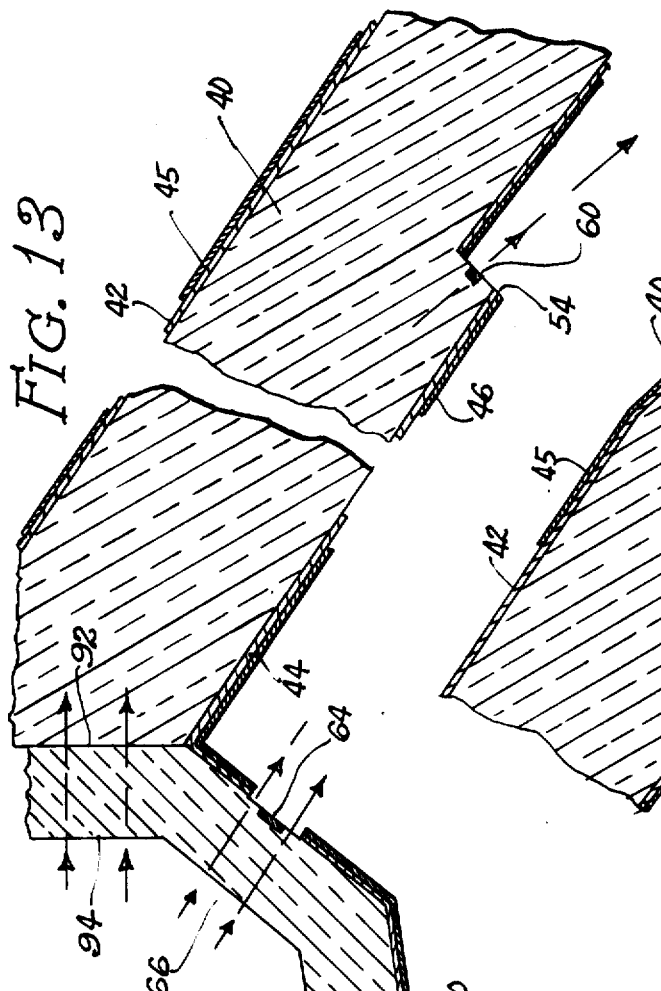
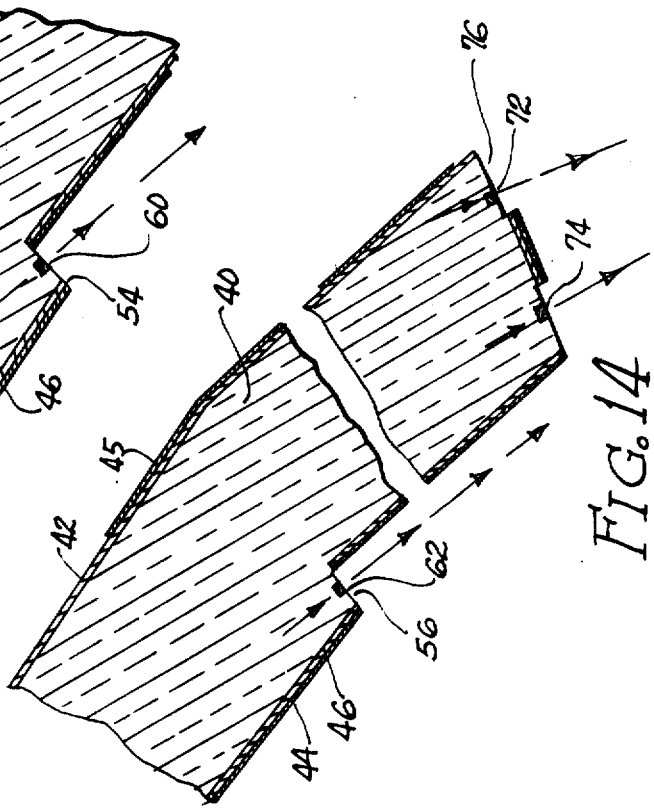
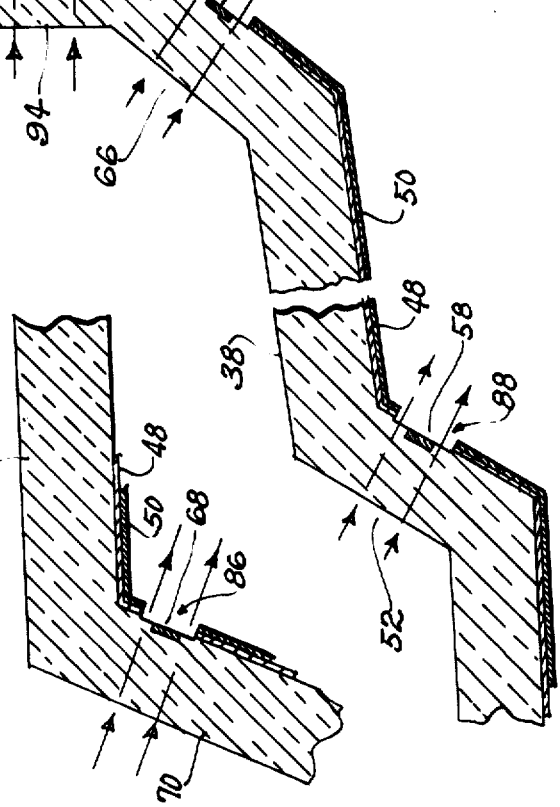
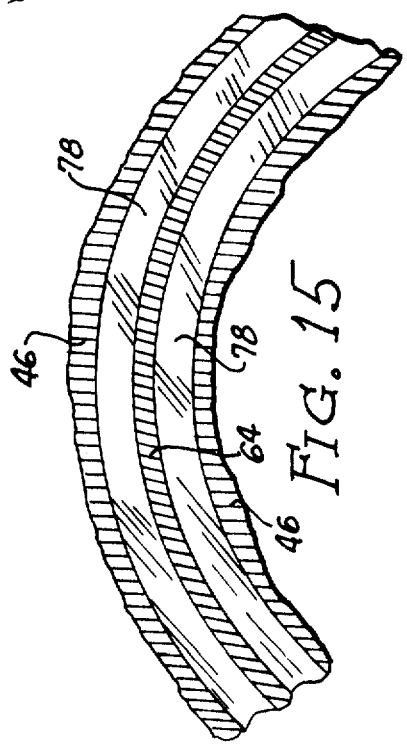

APPARATUS FOR DETERMINING CORNEA CONTOUR

This invention relates to an apparatus designed for determining the contour of the human cornea. The primary use of the apparatus relates to the fitting of contact lenses. Thus, the corneas of each individual will vary in contour, and measurements of the contour must be made to provide an appropriate design for a contact lens.

Many instruments have previously been designed for purposes of measuring the shape of the human cornea. These instruments include both visual and photographic systems for recording the data from which analysis of the corneal shape is to derived, and several methods have been described for analyzing the information obtained from visual examination or photographic recording to determine by suitable mathematical manipulation of the data, the shape of the cornea.

It is a general object of this invention to provide an improved apparatus for the preparation of photographs of the human cornea whereby mathematical exercises can be undertaken for purposes of determining the contour of the cornea.

It is a more specific object of this invention to provide an apparatus of the type described which is capable of providing highly accurate photographs thereby simplifying mathematical computations and which is characterized by a highly efficient and easily handled operating procedure.

These and other objects of this invention will appear hereinafter and for purposes of illustration but not of limitation, the specific embodiments of the invention are shown in the accompanying drawings in which:

FIG. 4 is a plan view, partly cut away, of the construction;

FIG. 5 is a detailed, sectional view taken about the line 5-5 of FIG. 1;

FIG. 6 is a detailed, sectional view taken about the line 6-6 of FIG. 1;

FIG. 7 is a vertical, sectional view taken about the line 7-7 of FIG. 1;

FIG. 8 is a vertical, sectional view taken about the line 8-8 of FIG. 1;

FIG. 9 is an elevational view of the opposite end of the apparatus;

FIG. 10 is a detailed view of the light pattern developed by the target on a perfect sphere;

FIG. 11 is a detailed view of the light pattern developed by the target on an eye having an irregular contour;

FIGS. 12, 13 and 14 are enlarged fragmentary, sectional views of portions of the target; and, FIG. 15 is an enlarged fragmentary view illustrating the configurations of the transparent gap formed in the target.

Figure 1:
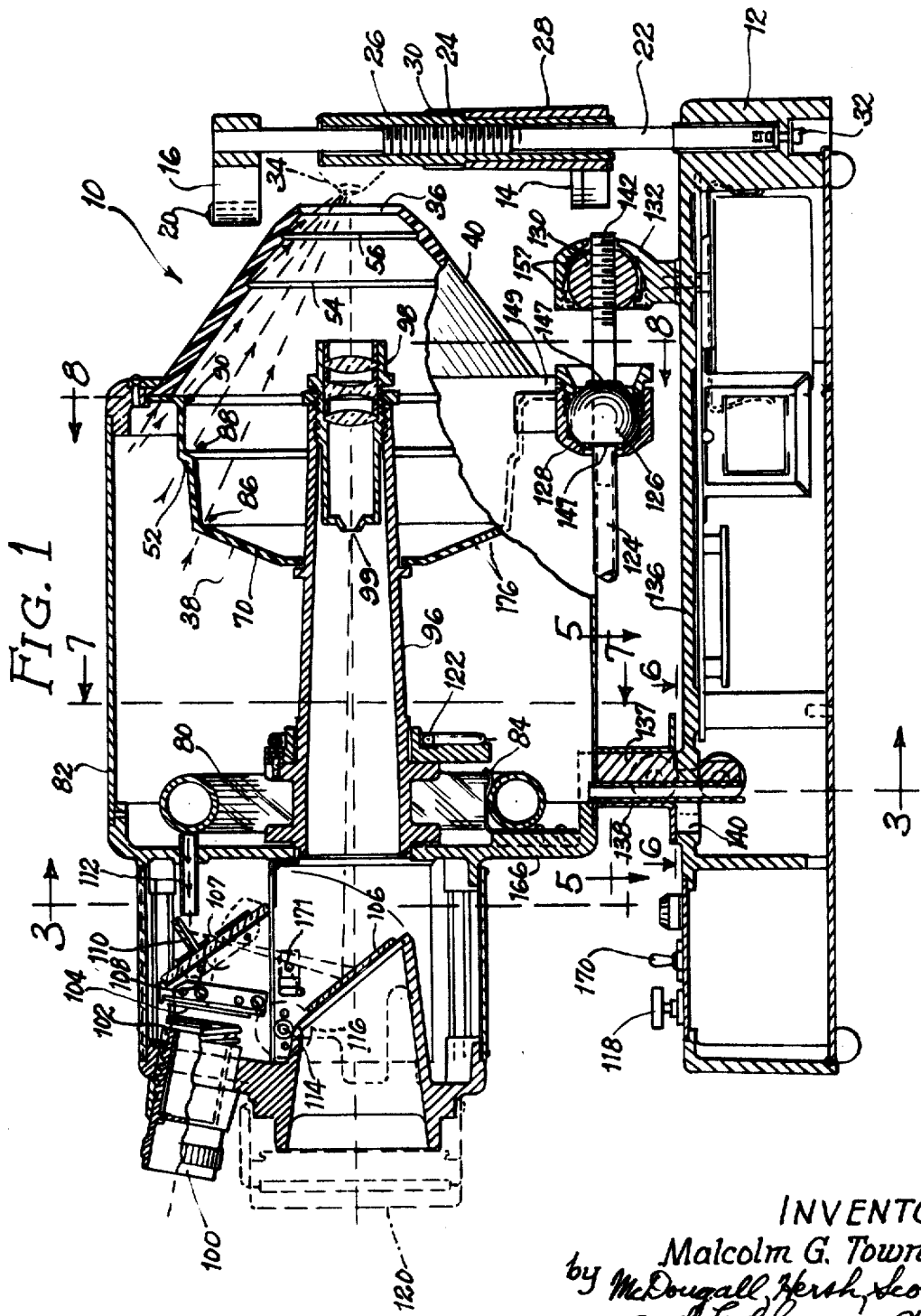
FIG. 1 is a side elevational view, partly in section, illustrating the apparatus of the invention.
Figure 3:
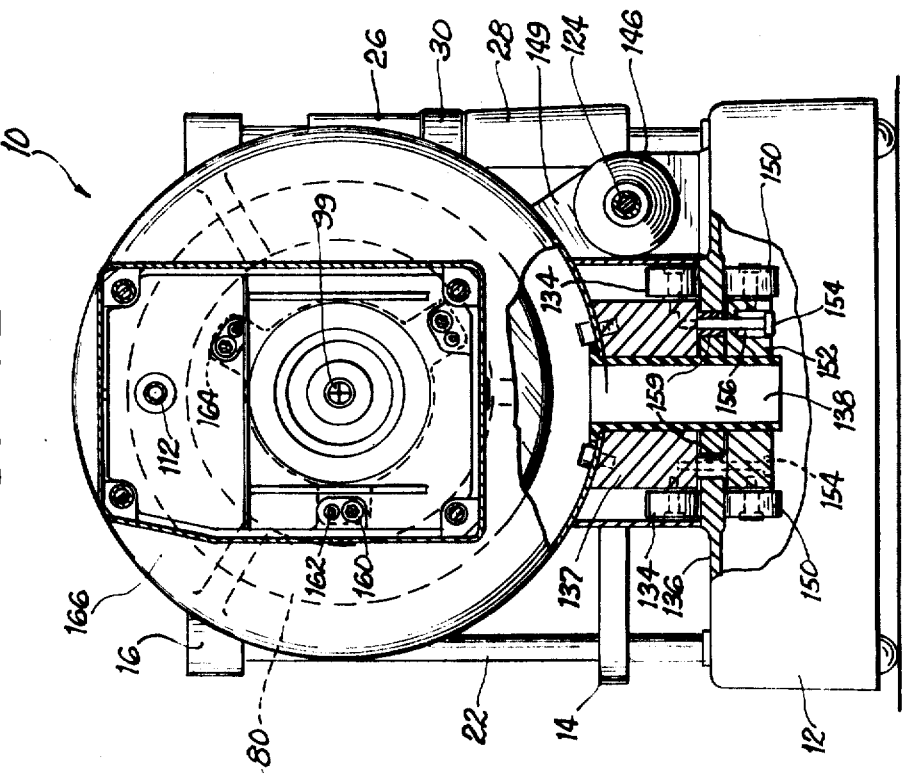
FIG. 3 is a vertical sectional view taken about the line 3-3 of FIG. 1.
Figure 2:
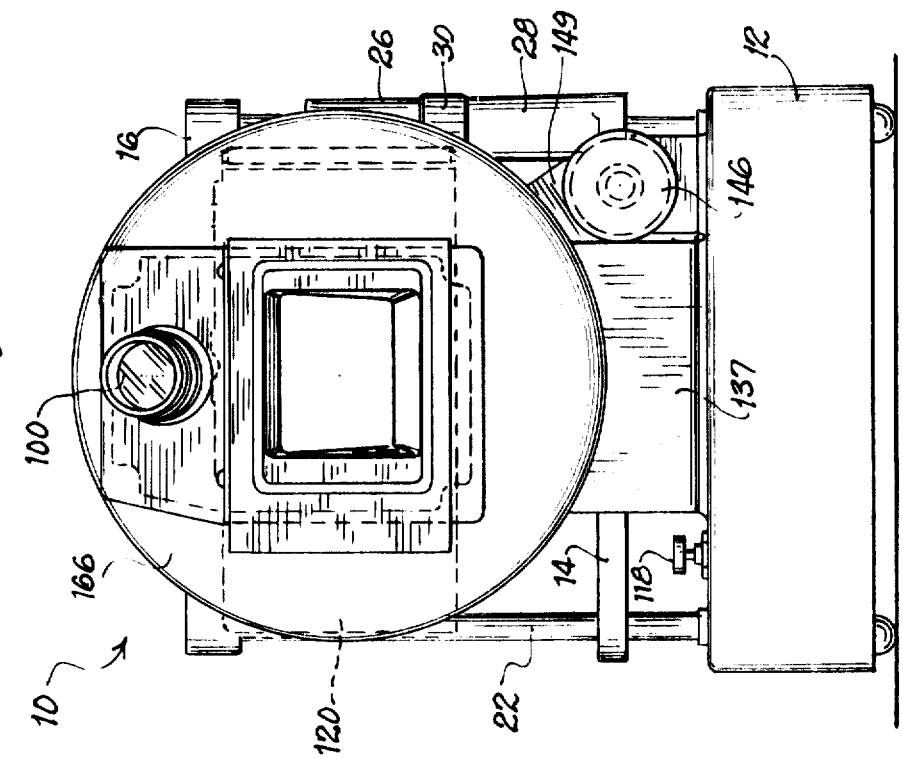
FIG. 2 is an end elevational view of the apparatus.

The apparatus of this invention generally comprises an illuminated target designed to develop a light pattern on the eye surface. A camera is positioned in line with the reflected light from the eye for providing a photographic record of the light pattern.

The improvements of the invention relate to certain structural elements including the target structure. The target is formed from a pair of hollow plastic shells with one of the shells being conically shaped and defining an opening at its narrow end portion.

The target shells are covered with an opaque material except in areas, preferably circular, which comprise gaps in the opaque material. A light source is provided behind the target so that a definite light pattern is transmitted through the target and reflected from the surface of the eye forming a virtual image behind the corneal surface. The construction is designed so that a known pattern will be formed on a perfectly spherical element. By means of mathematical calculations, the pattern developed on the human eye can be compared with the spherical pattern to determine the location and extent of variations from a perfect sphere. Suitable mathematical procedures are described in an article by the inventor entitled "New Equipment and Methods for Determining the Contour of the Human Cornea" appearing in Contacto, vol. 11, No. 4, Dec. 1967 issue, at page 72. In addition to the mathematical discussion, this article discloses background material relative to the subject matter of this invention along with many of the features disclosed and claimed herein.

The apparatus of the invention is provided with a through-the-lens focusing arrangement so that the operator will have a precise idea of the nature of photograph which will be achieved and can bring the image into sharp focus and proper centering by observation of the viewing screen. The target and camera are mounted on an adjustable housing with the controls being such that finite adjustments can be made to insure accurate alignment. The adjustment of the system is facilitated through the use of a light tube and mirror combination which insures that the line of sight will be in accurate alignment with the camera lens.

FIGS. 1 through 4 and 9 illustrate a measuring apparatus 10 characterized by the features of this invention. The apparatus includes a supporting base 12 which also serves as a housing for some operating elements to be described.

A headrest construction is provided at one end of the apparatus. This construction includes a horizontally disposed chin rest 14 and a forehead rest 16. The pads 18 and 20 indicate the specific area for positioning of the head during a measuring operation.

The headrest arrangement is supported by means of a pair of posts 22 extending upwardly from the base 12. One of the posts is provided with an intermediate threaded section 24 having a rotatable adjusting cylinder 26 associated therewith. The adjusting cylinder carries a supporting cylinder 28 with the bar 14 being integrally formed with this supporting cylinder. The bar 14 defines an opening at its opposite end for receiving the other post 22. A knurled portion 30 is formed on the cylinder 26, and rotation of this cylinder will provide for raising and lowering of the chin rest bar. The lower ends of the posts 22 are supported in bores defined by the base 12.

When the head of a patient is positioned on the rest, adjustments are made to position on the eye 34 centrally of the opening 36 defined by the target. This target consists of a pair of shells 38 and 40.

Each of these shells is formed of transparent material. Shell 38 must reflect a large portion of the light falling on it into the interior of the cavity formed by housing 82 and shell 38. This can be accomplished by coating the interior with an opaque white paint of high reflectance or with evaporated aluminum as shown at 48 (FIGS. 12 and 13). A black enamel coating 50 may be applied over the reflective coating 48.

The surface of shell 40 must also reflect the light falling on them, but in the case of shell 40, the light enters the body of the plastic material through the edge at 92, so that the polished surface of the plastic shell 40 is, of itself highly reflective for light which is within the shell material, and any coating may be dispensed with. Alternatively, both the inner and outer surfaces of shell 40 may be coated with an evaporated coating of aluminum 42 and 44. A black enamel 46 may be applied over the coating 44, and a decorative enamel of any desired color 45, may be applied over the outer surface coating 42. These surfaces define an irregular configuration in order to provide properly located illuminated target areas. In the case of the shell 38, the sidewall of the shell is stepped at 52. The shell 40 is in the shape of a cone with wall portions being machined away to provide steps 54 and 56. A groove 58 is cut into the step 52, and grooves 60 and 62 are formed in the steps 54 and 56.

An additional groove 64 is formed on the inner face of the angularly disposed portion 66 adjacent the outer end of the shell 38. Another groove 68 is formed in the top wall 70 of the shell 38 adjacent the juncture with the sidewall. Finally, a pair of grooves 72 and 74 are cut into the edge 76 at the narrow end of the shell 40. All of the grooves mentioned are provided in the shells prior to the application of the coatings.

Once the coatings have been applied, means are provided for removing portions of the coatings in the areas of the several grooves so that gaps for light transmission may be provided. The shells could, for example, be placed on a lathe and the coatings machined away.

When the coatings 44, 46, 48 and 50 are initially applied, they will fill the grooves and subsequent machining will leave the coatings in the grooves. Accordingly, an arrangement such as shown in FIG. 15 will be provided wherein the groove 64 will be filled with an opaque material while annular gaps 78 will be provided on either side of the groove. This same general relationship will be provided in each instance since an opaque line will be located in the area of the grooves with openings for light transmission located on either side of the line.

A fluorescent light 80 is located within the cylindrical housing portion 82 of the construction. Suitable clips 84 are provided to permit easy replacement of the fluorescent bulb. As best shown in FIG. 1, light from the bulb will be directed to the back side of the shell 38 for passage through the shell in the areas 86, 88 and 90, these areas being located at the positions of the grooves 68, 58 and 64, respectively.

The illumination from the fluorescent light will also be passed into the edge 92 of the shell 40, this edge abutting the outer flange 94 of the shell 38. Because of the outer coating 42 and the inner coatings 44 and 46, the shell 40 acts as a light pipe. The light will be transmitted through the body of the shell and out through the gaps provided in the area of the steps 54 and 56 and also through the edge 36 of the shell.

The fluorescent light 80 is positioned in surrounding relationship relative to an elongated tubular lens holder 96. A threaded member 98 is provided at the end of the holder, and this threaded member carries actual lens means.

An eyepiece 100 is provided for the operation. The eyepiece comprises a rotatable tubular member provided with screw threads 102 whereby the lens can be adjusted to suit the operator so that the light pattern reflected in the eye can be viewed on the split Fresnel screen 104. In accordance with conventional practice, this arrangement provides a horizontal offset of the image to insure proper focusing on the screen. The image reflected from the eye can be viewed by the provision of a first mirror 106 which directs the light onto a second mirror 108 which in turn directs the light onto the screen 104.

The mirror 108 is provided with an outwardly extending mirror 110 on its back surface, and a light tube 112 directs light from the lamp 80 to the mirror 110. This beam of light is then passed through a hole 107 in the reflecting surface of the mirror 108 and is reflected off the mirror 106 through the lens 98 into the eye. The patient then sees a small spot which is employed to give a fixation point for the patient during adjustment and exposure. The lens can be centered on the eye, through the use of adjustment means to be described, by means of an autocollimation technique. Specifically, the opening 107 in the mirror through which the light passing from the light tube 112 passes through the mirror 108, will appear as a shadow when viewed against a background of general illumination provided by the light from the target. The light passing through the hole 107 in the mirror is imaged in the cornea by the lens 98, and the light is returned to the lens 98 by reflection from the cornea. When the axis of the lens 98 is normal to the surface of the cornea at the point where the image is formed, the light is returned to the lens and the image of the opening 107 in the mirror 106 is returned to coincide with the opening 107, and the operator can see this bright image superimposed on the shadow formed on the focusing screen 104 by the opening 107 as described above, and by bringing the image into coincidence with the shadow, can insure that the axis of the lens if normal to the corneal surface at the point where the image of the hole 107 is formed on the corneal surface.

There is provided behind the lens 98 at a distance equal to the focal length of the lens, a cross-wire 99. The light passing from the opening 107 in mirror 108 furnishes illumination by which the patient can see the image of this cross wire formed substantially at an infinite distance, thereby facilitating his ability to align his visual axis with the optical axis of the instrument.

The provision of the illuminated dot is also of value in the initial alignment of the instrument during centering of the lens within the target. To accomplish this initial alignment, a polished steel ball of a known diameter is mounted in the approximate position occupied by a patient's eye. With the ball in place, the lens is adjusted to bring the illuminating spot into coincidence with the "pupil" reflection from the ball.

The mirror 106 is pivotally mounted on shaft 114, and a rotary solenoid 116 is tied to this shaft. This solenoid is connected for energization when the pushbutton 118 is depressed by the operator for purposes of securing a photographic record of the light pattern on the eye. The solenoid operates to swing the mirror 106 upwardly whereby light reflected from the eye will be passed directly to the camera 120. This camera may comprise a modified Polaroid Land camera provided with a shutter which will open upon depression of the pushbutton. An electronic flash tube 122 is secured in surrounding relationship relative to the tubular member 96, and this tube is adapted to be flashed by a switch 171 which is closed by the mirror 106 when it reaches the upper limit of its swing. Depression of the pushbutton may also operate to turn off the lamp 80 during operation of the flash tube.

The tubular housing portion 82 is connected to a double socket comprising a threaded rod 124, a ball 126 and socket 128, and a second ball 130 and socket 132.

A rear support 137 is connected to the tubular housing 82. This support carries rollers 134 which normally ride on the upper surface of the top wall 136 defined by the base 12. A downwardly extending tubular element 138 is received in an opening defined by the support 137, and a slot 140 is defined by the top wall 136 to permit some freedom of movement for the member 138.

The rod 124 extends to an adjusting knob 146. The ball 130 is internally threaded and the rod 124 is externally threaded to enable movement of the target structure for the distance permitted by the slot 140. The rod 124 is fixed in position relative to the ball 126 by means of clips 147 and the target structure moves with the rod due to the connection between the socket 128 and extension 149 of the target.

An additional set of rollers 150 is supported on a lower carriage 152. These additional rollers ride against the under surface of the top wall 136. A pair of pins 154 are received in bores defined by the lower carriage 152 and the threaded upper ends of these pins are received by the support 137. Springs 156 are interposed between the heads of the pins and the seat of the bores to permit movement of the pins 154 relative to the wall 136. In the position of the structure shown in FIG. 3, the pins are in their lowermost position. When the rod 124 is pivoted by movement of the knob 146, the entire assembly can be pivoted about the location determined by the rollers 150 and 134 and the wall 136 of base 12, to bring the opening 34 into the desired relationship with the eye of the patient to secure autocolimation as hereinbefore described. Rotation of the knob 146 advances and retracts the entire housing to and from the patient's eye to achieve proper focusing adjustment and also described. A packing material 157 is interposed between the ball 130 and the socket 132 to provide strong frictional engagement so that the assembly can be maintained in this position until the operator again wishes to move the assembly.

Additional pairs of rollers 159 are located between the support 137 and the lower carriage 152. These rollers are confined in slots 161 defined by wall 136, and the rollers serve to maintain alignment of the carriage assembly.

Means are also provided for accurate positioning of the lens holder 96 relative to the camera and relative to the target opening 36. These means include three clamp screws 160 and three adjacent set screws 162 located on ears 164 located at the end of the member 96. As shown in FIG. 4, the clamp screw 160 can be rotated to vary the distance between the tubular member and the backwall 166 of the housing 82. The associated set screws are tightened against the ears 164 when the desired relationship is achieved. The three-positioned adjustment permits accurate axial alignment in the construction.

Appropriate wire leads may extend from within the base 12 through the tubular member 138 which serves as a wire guide. Connections to the solenoid 116, lamp 80 and electronic flash tube 122 may thus be provided.

In the operation of the device, the patient places his head in position with his chin on the pad 18 and forehead on the pad 20. A switch button 170 is provided for turning on the light, and the operator can then look through the eyepiece 100 and see an image of the target pattern on the screen 104. The spot provided by means of the light tube 112 and mirror 110 is then centered relative to the eye by adjusting the position of the assembly with the handle 146. Focusing on the screen is also achieved by rotation of this handle. When the centering and focusing operations are completed, the pushbutton 118 is depressed. Any suitable switch may be actuated by the pushbutton to cut off current to the lamp 80 and to energize the solenoid 116 and the flash tube 122 with time delay means being provided to delay the last operation. A time delay between energization of the solenoid and actuation of the flash also can be provided by including a switch 171 which will be actuated by the mirror 106 to avoid the possibility of the mirror interferring with the passage of light to the camera.

FIG. 10 illustrates the preferred light pattern as it would appear on a perfect sphere. It will be noted that a plurality of circular lines are formed, the lines being in pairs due to the provision of the grooves between the light-transmitting gaps. FIG. 11 illustrates an exaggerated example of a pattern appearing on a cornea. The bands of light become noncircular thereby illustrating variations from a spherical surface. By measuring the distance from a center point in any direction and by making appropriate mathematical calculations, the degree of variations from a sphere can be determined, and the shape of the cornea accurately computed.

In previous practice, patterns such as shown in FIG. 11 have been used wherein single lines rather than double lines appear. The target structure of this invention provides distinct lines due to the presence of the grooves between adjacent light-transmitting gaps. By providing the narrow opaque area between the gaps, there is a tendency to prevent aberrations of the light. Thus, sharper lines are provided on the photographic reproduction with this arrangement. The use of a pattern of bright double rings with a dark ring between them has been previously suggested.

As shown in FIGS. 10 and 11, the light patterns include a pair of spots 170 below the center and a single spot 172 to the right of center. These spots are provided due to the presence of holes 174 and 176 defined by the target shelf 38 (FIG. 8). These small holes are provided so that a person viewing the photograph can immediately orient the photograph relative to the position of the eye. Thus, the two dots will always be on the bottom half of the eye while the single dot will always be on the right side of the eye.

It will be understood that various changes and modifications may be made in the above described construction which provide the characteristics of this invention without departing from the spirit thereof particularly as defined in the following claims.

I claim:

1. In an apparatus for determining the contour of the human cornea comprising a target structure, means for illuminating the target structure for developing light patterns on eye surfaces, means for reflecting an image of said light pattern to a viewing area, and a camera positioned at said viewing area for providing a photographic record of the pattern, the improvement in said target structure comprising a first hollow shell having a generally cone-shaped configuration, a relatively small opening defined at the small diameter end of said first shell, the opposite end of said shell defining a large diameter base portion, a second hollow shell defining a corresponding large diameter base portion at one end, said second shell defining an inwardly extending wall, means for securing the respective base portions of said shells together, means for positioning the head of the person being tested whereby an eye of the person is positioned adjacent to said small diameter end of said first shell and substantially centrally of said opening in said first shell, said first shell operating as a light guide for transmitting light from its base portion toward its small diameter end, and including a plurality of separate, light transmitting, spaced apart gaps defined by each of said shells, the arrangement of said gaps determining the light pattern projected onto an eye when said target is illuminated, said apparatus further including stepped portions defined on the interior surfaces of each of said shells, at least some of said gaps being located on said stepped portions, the stepped portions of said first shell being formed by progressively reducing the wall thickness of said first shell in the direction toward the small diameter end thereof, and the stepped portions of said second shell being formed by means of bends in the shell wall, and wherein said target is formed of a transparent plastic material, at least one surface of the target being covered with an opaque coating in all areas except in the positions of said gaps, and including a light reflecting coating formed on the exterior of at least a portion of the target structure whereby said portion of the target structure provides a light guide for directing light to the gaps in said portion.

2. An apparatus in accordance with claim 1 including grooves defined in the area of at least some of said gaps, said opaque coating filling said grooves whereby the grooves provide a dividing line in light beams passed through said gaps.

3. An apparatus in accordance with claim 1 including a circularly shaped fluorescent lamp mounted behind the target structure to provide illumination of the target structure for viewing of the light pattern by the operator of the structure, and including a circular photo flash element mounted behind the target structure to provide illumination for securing a photograph.

4. An apparatus in accordance with claim 1 including a tubular lens holder providing a passage for light reflected from the eye to the camera, and including adjusting means for aligning the holder relative to said opening in said target.

5. An apparatus in accordance with claim 1 including an eyepiece for viewing light patterns prior to taking a photograph, a mirror system for directing reflected light, said mirror system including a first mirror in the light path between the eye and the camera whereby the reflection viewed is the same as the reflection photographed, and including means for moving said first mirror out of said path prior to taking a photograph.

6. An apparatus according to claim 5 wherein the means for moving said first mirror are automatically operated upon actuation of means for taking a photograph, and including a first lamp for illuminating the target during viewing with the eyepiece, and a second photoflash element for illuminating the target during taking of a photograph, and wherein energization of said photoflash element occurs responsive to movement of said first mirror out of said light path.

7. An apparatus in accordance with claim 1 including carriage means for supporting said target structure, and a threaded rod associated with said carriage means whereby turning of the rod operates to move the carriage means longitudinally.

8. An apparatus in accordance with claim 7 including roller means on said carriage means, spring means associated with said roller means, said roller means being adapted to yield in response to the application of vertical movement to said rod whereby said target structure is adapted to be moved vertically in opposition to said spring means.